(12) United States Patent
Wang et al.

(10) Patent No.: US 8,920,614 B2
(45) Date of Patent: Dec. 30, 2014

(54) DEVICE DESIGNED FOR CONTINUOUS PRODUCTION OF GRAPHENE FLAKES BY ELECTROCHEMICAL METHOD

(71) Applicant: Chung-Shan Institute of Science and Technology, Longtan Township, Taoyuan (TW)

(72) Inventors: Pai-Lu Wang, Taoyuan (TW); Chi-Wei Liang, Taoyuan (TW); Chuen-Ming Gee, Taoyuan (TW); Yi-Cheng Cheng, Taoyuan (TW); Ching-Jang Lin, Taoyuan (TW)

( * ) Notice: Subject to any disclaimer, the term of this patent is extended or adjusted under 35 U.S.C. 154(b) by 0 days.

(21) Appl. No.: 13/719,186

(22) Filed: Dec. 18, 2012

(65) Prior Publication Data

US 2014/0166475 A1  Jun. 19, 2014

(51) Int. Cl.
*C01B 31/04* (2006.01)
*C25B 15/08* (2006.01)

(52) U.S. Cl.
CPC .............. *C01B 31/0469* (2013.01); *C25B 15/08* (2013.01)
USPC ....................................... 204/229.4

(58) Field of Classification Search
USPC .......................................... 205/413, 463, 615
See application file for complete search history.

(56) References Cited

U.S. PATENT DOCUMENTS

| | | | |
|---|---|---|---|
| 4,822,469 A | * | 4/1989 | Shimomura et al. ........ 204/228.5 |
| 5,893,979 A | * | 4/1999 | Held ......................... 210/748.01 |
| 2009/0169467 A1 | * | 7/2009 | Zhamu et al. ................. 423/448 |
| 2010/0326894 A1 | * | 12/2010 | Palmgren et al. ............. 209/659 |
| 2011/0052702 A1 | * | 3/2011 | Asakawa et al. .............. 424/489 |

FOREIGN PATENT DOCUMENTS

CN        102249222 A   * 11/2011

OTHER PUBLICATIONS

Su et al., High-Quality Thin Graphene Films from Fast Electrochemical Exfoliation, 5 ACS Nano 3, 2332 (Feb. 10, 2011).*
Liu et al., One-Step Ionic-Liquid-Assisted Electrochemical Synthesis of Ionic-Liquid-Functionalized Graphene Sheets Directly from Graphite, 18 Adv. Funct. Mater. 1518 (2008).*
Shen et al., CN 102249222 A, English Abstract and Machine Translation (2011).*

* cited by examiner

*Primary Examiner* — James Lin
*Assistant Examiner* — Ho-Sung Chung

(57) ABSTRACT

Disclosed is a device designed for a continuous production of graphene flakes by an electrochemical method. The device consists of an electrochemical unit for generating graphene flakes by an electrochemical exfoliation; a filtration unit for separating the graphene flakes from an electrolyte solution; a guiding path connected to the electrochemical unit and transports the graphene flakes and the electrolyte solution into the filtration unit; a grading collection unit for accepting the separated graphene flakes from the filtration unit and separating the graphene flakes by size. The device can achieve the effect of producing high-quality graphene flakes in mass production electrochemically, continuously and quickly.

13 Claims, 2 Drawing Sheets

DEVICE DESIGNED FOR CONTINUOUS PRODUCTION OF GRAPHENE FLAKES BY ELECTROCHEMICAL METHOD

BACKGROUND OF THE INVENTION

1. Field of the Invention

The present invention relates to a device for producing graphene, and more particularly to the device for a continuous production of graphene flakes by an electrochemical method.

2. Description of Related Art

In 2004, the research team of Professor A. K. Geim at the University of Manchester, England attached a thin layer of graphite (known as graphene) on an adhesive tape and another adhesive tape on the other side of the graphene, and then torn the two adhesive tapes apart to exfoliate the graphene into two thinner layers, and the aforementioned procedure is repeated for several times to obtain single atomic layer of graphene. Through the observation by a transmission electron microscope (TEM), carbon atoms in graphene has a highly-ordered arrangement.

The graphene has many excellent properties including the high mechanical strength (~1,100 GPa), hardness, brittleness and flexibility, and gases cannot penetrate through the thin layer of graphene, and a high heat conductivity coefficient up to 5300 W/m·K which is better than carbon nanotubes and diamond, and the electron mobility of graphene at room temperature exceeds 15000 $cm^2/V·s$ which is higher than the carbon nanotubes (approximately equal to 10000 $cm^2/V·s$) and more than ten times of crystalline silicon (1400 $cm^2/V·s$), and the resistance of graphene is approximately equal to $10^{-6}$ $\Omega·cm$ which is lower than that of copper or silver.

In general, graphene is prepared or produced by the following four main methods. (1) Mechanical exfoliation method: Graphene is manufactured from graphite, and this method can produce single-layer or multi-layer graphene simply, easily and quickly, but this method is suitable for the manufacture of a small quantity of graphene only; (2) Chemical vapor deposition method or an epitaxial growth method: Graphene is manufacturing by passing and depositing a thermally cracked hydrocarbon gas source onto a nickel or copper plate. This method has the feature of producing large-area single-layer or multi-layer graphene easily and the difficulty of controlling the uniformity and thickness of the graphene; (3) Method of growing graphene on an insulating substrate: A very thin layer of graphene is grown on a surface of silicon carbide. The method has the drawbacks of incurring a high cost and having difficulties of manufacturing large-area graphene; and (4) Method of using organic acidic solvent to insert layers to produce graphene oxide (GO) and obtaining grapheme by a reduction procedure: This method has the drawbacks of requiring a long processing time, and having an inconsistent quality of the grapheme since the reduced grapheme may be deformed or warped easily.

In addition, an electrochemical method can be used. Graphene flakes are produced by changing an electric voltage at room temperature. This method can simplify the manufacturing process without requiring any high-temperature reduction procedure and can produce large graphene flakes easily.

As described above, the method of producing grapheme by an electrochemical method has the advantages or using a simple, easy and quick manufacturing procedure and producing high-quality large-area grapheme. At present, related industries require a method and a device of producing graphene flakes by a continuous automated electrochemical method to exfoliate graphite electrodes, so as to reduce the labor and manufacturing time and produce graphene flakes by mass production. Therefore, the present invention provides a device for a continuous production of graphene flakes by an electrochemical method that takes both cost and manufacturing time into consideration and no longer requires a high temperature reduction procedure, and thus the present invention can achieve a quick mass production of high-quality graphene flakes.

SUMMARY OF THE INVENTION

In view of the aforementioned problems of the prior art, it is an objective of the present invention to provide a device for a continuous production of graphene flakes by an electrochemical method, wherein an electrochemical unit, a filtration unit, a guiding path, and a grading collection unit are integrated for producing high-quality graphene flakes.

To achieve the aforementioned objective, the present invention provides a device for a continuous production of graphene flakes by an electrochemical method, comprising: an electrochemical unit, for exfoliating the graphene flakes by an electrochemical method; a filtration unit, for separating the graphene flakes from an electrolyte solution; a guiding path, coupled to the electrochemical unit, for transporting the graphene flakes and the electrolyte solution to the filtration unit; a grading collection unit, for receiving the graphene flakes separated by the filtration unit and separating different sized graphene flakes.

The electrochemical unit includes a positive and negative electrode time-switching DC power, an auxiliary heating device, an electrolytic bath and a graphite electrode set, wherein the positive and negative electrode time-switching DC power is coupled to the graphite electrode set, and the graphite electrode set is arranged in an electrolyte solution in an electrolytic bath for an electrochemical reaction. The graphite electrode set includes at least two graphite electrodes or even numbered graphite electrodes, and half of the graphite electrodes is used as positive electrode(s) and the other half of the graphite electrodes is used as negative electrode(s), and the graphite electrode is made of a material selected from natural graphite, highly crystalline graphite, coke-based artificial graphite, mesophase pitch-based artificial graphite, polymer based artificial graphite, carbon fiber, graphite fiber, or carbon/carbon composite material, and the graphite electrode electrodes of the same polarity are connected in parallel and arranged alternately with one another, and the graphite electrodes of different polarities are separated with an interval apart from one another to constitute an array assembly, and then positive electricity or negative electricity is passed, and an electrochemical reaction with an appropriate electrolyte solution is used to produce graphene flakes. The positive and negative electrode time-switching DC power is coupled to the graphite electrodes to supply positive and negative electricity to facilitate the electrochemical reaction. In the meantime, the switch of electrodes is completed within a controlled time, so that the electrodes in the graphite electrode set can be electrically switched to promote the electrochemical reaction. The auxiliary heating device includes a microwave, ultrasound or non-contact heating device for heating the electrochemical unit to improve the efficiency of producing the graphene.

An electrolyte solution tempering tank electrochemical unit, and the electrolyte solution tempering tank is disposed on a side of the electrolytic bath, wherein the bottom of the electrolyte solution tempering tank is higher than the level of the electrolyte solution in the electrolytic bath. In addition, an electrolyte solution monitoring device can be installed, wherein the electrolyte solution monitoring device includes a pH meter and an electrolyte solution level monitoring device. When the pH value of the electrolyte solution in the electrolytic bath is measured and determined to be incompliance with a set value, or the level of the electrolyte solution detected by the electrolyte solution level monitoring device has not reached a set value, the electrolyte solution is filled into the electrolytic bath or the electrolyte solution in the electrolyte solution tempering tank is adjusted.

An end of the guiding path is coupled to the electrochemical unit, and an outlet end is disposed above the filtration unit, and both ends of the guiding path are not in a horizontal state but the guiding path has a tilted angle. When the electrochemical unit produces graphene flakes, the graphene flakes float on the electrolyte solution. The guiding path has a function of transporting the electrolyte solution and the graphene flakes by using the tilted angle to flow the electrolyte solution and the graphene flakes to the filtration unit.

The filtration unit includes a rotary filter belt and an electrolyte solution recycling tank, wherein the rotary filter belt is a mesh structure and has a width greater than the outlet end of the guiding path. When the electrolyte solution and the graphene flakes are transported through the guiding path to the rotary filter belt, the mesh structure captures the graphene flakes, and the electrolyte solution keeps flowing down into the electrolyte solution recycling tank, so as to complete the operation of filtering and separating the electrolyte solution and the graphene flakes.

The rotary filter belt is a vertical rotary filter belt, so that the graphene flakes can fall down from the rotary filter belt by gravity, and the grading collection unit can receive the graphene flakes separated by the filtration unit. Therefore, the grading collection unit can be installed under the rotary filter belt and has a structure comprising a plurality of mesh structured sieves, and each sieve has a different mesh structure. In addition, a sieve vibrating device can be installed for vibrating the sieve, so that different sized graphene flakes can be separated by the vibration and the different mesh structured sieves, so as to complete the operation of separating the graphene flakes.

In the aforementioned device, a deionized water storage tank can be installed adjacent to the electrochemical unit, and the deionized water storage tank contains deionized water, so that the deionized water can be sprayed on the rotary filter belt to facilitate the graphene flakes to separate from the rotary filter belt and fall into the grading collection unit.

The technical characteristics of the present invention will become apparent with the detailed description of preferred embodiments and the illustration of related drawings as follows.

DETAILED DESCRIPTION OF THE PREFERRED EMBODIMENTS

The present invention mainly uses an electrochemical method to exfoliate graphite electrodes to produce graphene flakes which are suspended on a liquid surface of an electrolyte solution, and then an electrolyte solution in an electrolyte solution tempering tank is filled into an electrolytic bath continuously, so that the level of the solution rises and the solution overflows from the tank, and thus resulting in a flow of electrolyte solution into the electrolyte solution guiding path. As the graphene flakes flow with electrolyte solution to the rotary filter belt and attach onto a surface of the rotary filter belt, deionized water is sprayed inside out to wash the graphene flakes attached onto the surface of the rotary filter belt to a grading collection unit, and a filter structure is provided for sieving and collecting the graphene flakes. In the meantime, the electrolyte solution is washed away. A pH meter and am electrolyte solution level monitoring device can be installed to facilitate the process of supplementing the electrolyte solution at appropriate time, so as to maintain a continuous operation of the system.

Figure 1:
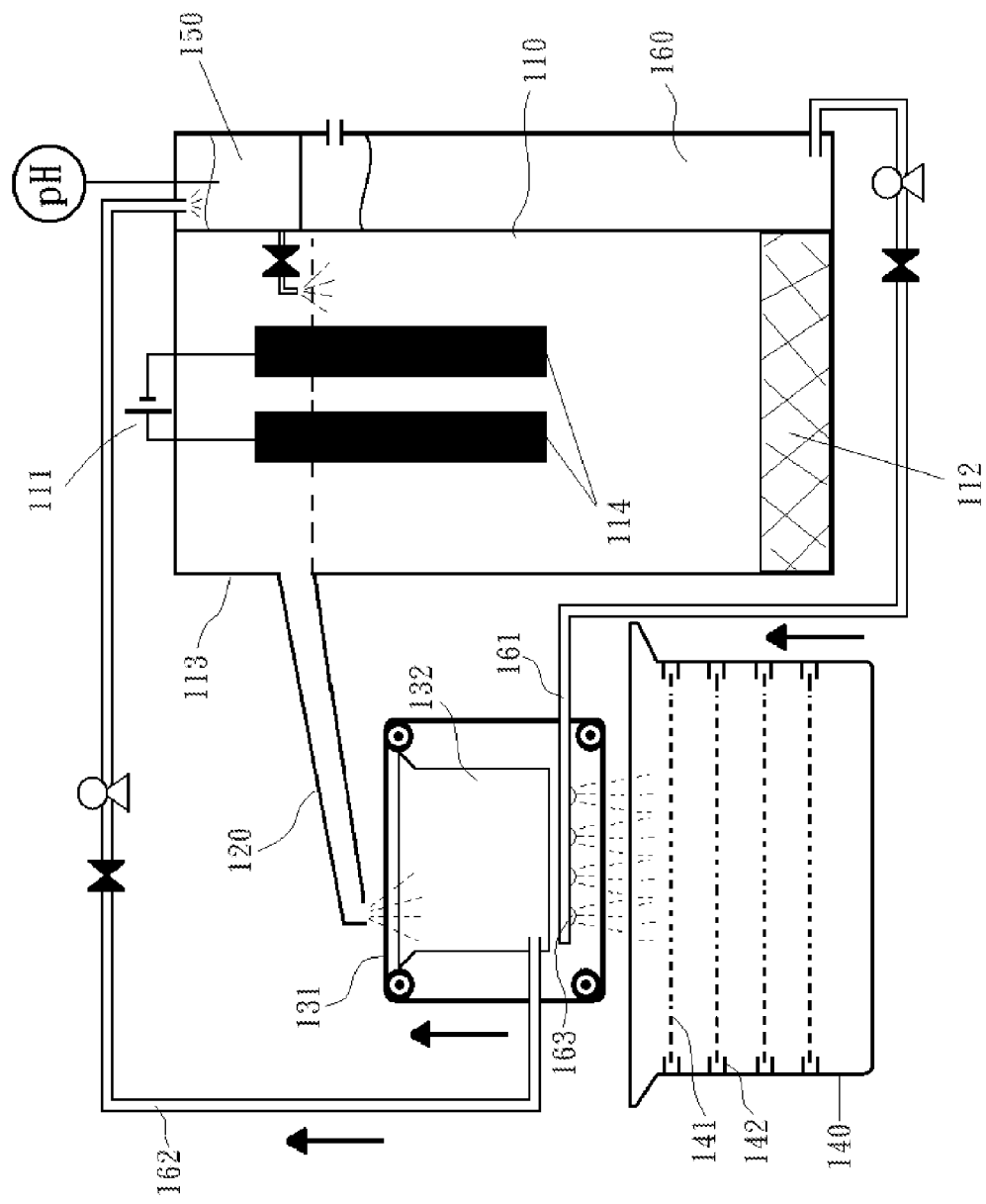
FIG. 1 is a schematic view of a device for a continuous production of graphene flakes by an electrochemical method in accordance with the present invention.

With reference to FIG. 1 for a schematic view of a device for a continuous production of graphene flakes by an electrochemical method in accordance with the present invention, the device comprises: an electrochemical unit 110 for exfoliating graphene flakes by an electrochemical method exfoliation and including a positive and negative electrode time-switching DC power 111, an auxiliary heating device 112, an electrolytic bath 113 and at least one graphite electrode set 114; a filtration unit 130, for separating the graphene flakes from an electrolyte solution, and including a rotary filter belt 131, and an electrolyte solution recycling tank 132; a guiding path, coupled to the electrochemical unit, for transporting the graphene flakes and the electrolyte solution to the filtration unit 130; a grading collection unit 140, for receiving the filtration unit 130 and separating the graphene flakes of different sizes.

Figure 2:
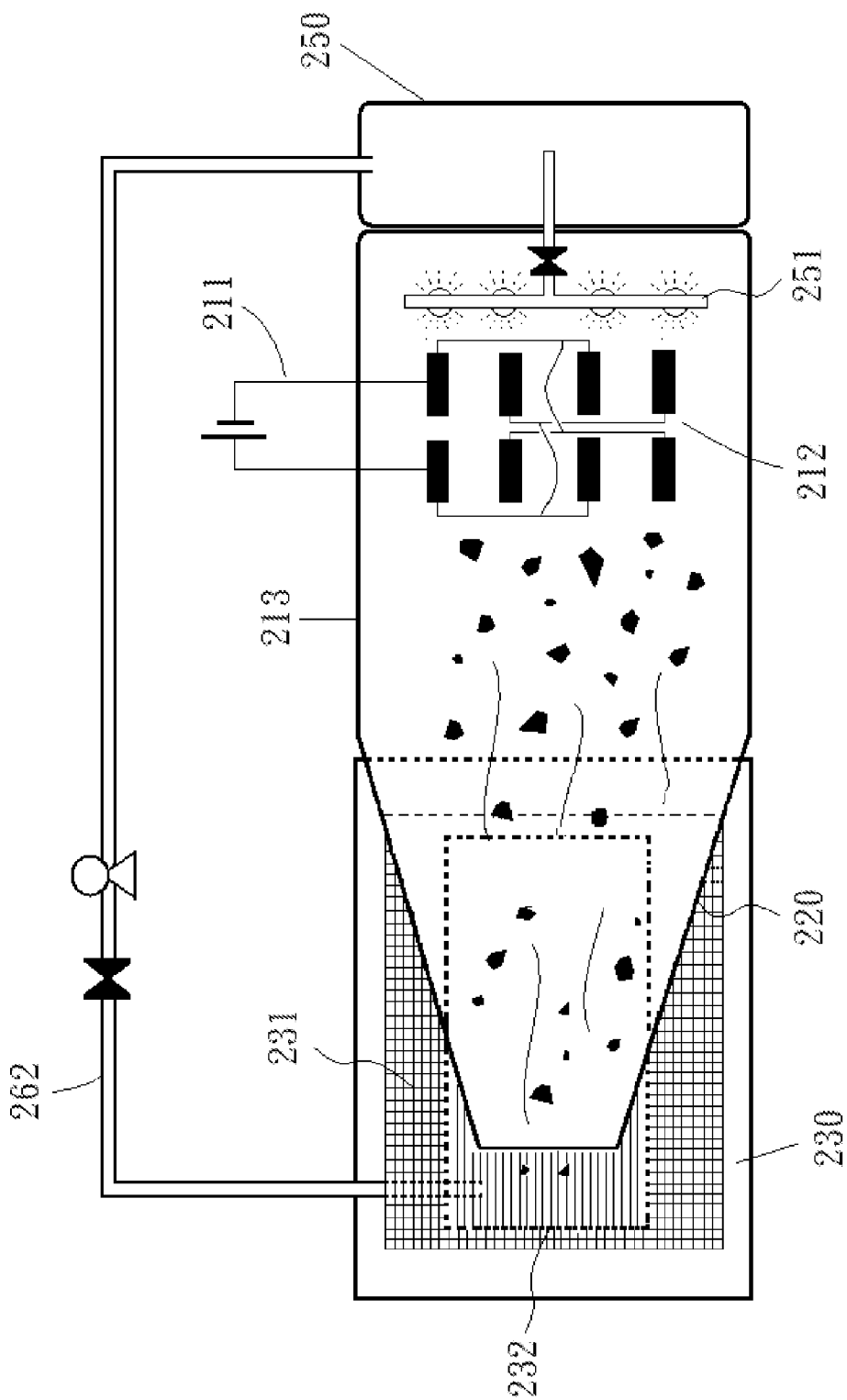
FIG. 2 is a top view of a device for a continuous production of graphene flakes by an electrochemical method in accordance with the present invention.

With reference to FIG. 2 for a top view of a device for a continuous production of graphene flakes by an electrochemical method in accordance with the present invention, the electrochemical method includes a positive and negative electrode time-switching DC power 211 with a function of supplying a constant current and automatically switching the polarity in a specific time interval, wherein the positive and negative electrode time-switching DC power 211 is connected to the graphite electrode set 212 for supplying DC power to the graphite electrode set 212, and the graphite electrode set 212 comprises at least two graphite electrodes, one used as a positive electrode and the other used as a negative electrode. However, the invention is not limited to two graphite electrodes only, but any even number of graphite electrodes including a plurality of positive electrodes and a plurality of negative electrodes can be adopted, and the electrodes of the same polarity are connected in parallel, and alternately with one another, and the graphite electrodes of an opposite polarity are inserted to form an array assembly. In this preferred embodiment, the graphite electrodes of the graphite electrode set 212 are connected in parallel to perform an electrochemical method, and the graphite electrode set 212 is installed in an electrolytic bath 213, and the electrolytic bath 213 contains an electrolyte solution composed of a sulfate or potassium hydroxide. After the graphite electrode set 212 is electrically conducted, the graphene flakes float on the electrolyte solution after the process including an intercalation and an exfoliation of the electrochemical method. The electrolytic bath 210 further has an auxiliary heating system such as a microwave, ultrasound or non-contact heating device. There are two main functions of the auxiliary heating system, one for providing heat energy to the graphite electrode and the electrolyte solution to expedite the electrochemical reaction; and the other for maintaining a constant temperature of the system to maintain a stable quality of the graphene product.

The present invention further comprises a guiding path 220, and an end of the guiding path 220 is coupled to the electrolytic bath 210, and the other end is an outlet disposed at the filtration unit 230, and both ends of the guiding path 220 are not in a horizontal state but have a tilted angle. An end of the guiding path 220 connected to the electrolytic bath 210 is higher, such that when the graphene flakes are produced, the electrolyte solution and the graphene flakes can be transported from the guiding path 220 to the filtration unit 230, and the guiding path 220 and the filtration unit 230 can be connected directly to the filtration unit 230 or the outlet end of the guiding path 220 of this preferred embodiment comes with an open design, so that the electrolyte solution and the graphene flakes can be transported to the filtration unit 230 by gravity. In this preferred embodiment, the filtration unit 230 is installed under the guiding path 220, and has a width greater than the outlet end of the guiding path 220 to facilitate receiving the electrolyte solution and the graphene flakes. When the electrolyte solution and the graphene flakes pass through the filtration unit 230, the graphene flakes are received by the mesh structured rotary filter belt 231, and the electrolyte solution falls into the electrolyte solution recycling tank 232, so as to complete the process of separating the graphene flakes from the electrolyte solution.

In the aforementioned process, the level of the electrolyte solution in the electrolytic bath 210 must be higher than the guiding path 220 before the electrolyte solution and the graphene flakes can be transported from the guiding path 220 to the filtration unit 230, so that the level of the electrolyte solution in the electrolytic bath 210 must be maintained at a fixed height. In this preferred embodiment, the electrolyte solution falls into electrolyte solution recycling tank 232, so that the electrolyte solution can be transported through a pipeline 262 into the electrolyte solution tempering tank 250. With an appropriate adjustment, the electrolyte solution is supplemented into the electrolytic bath 210 to maintain the required level of the electrolyte solution in the electrolytic bath 210. In addition, a pH meter and an electrolyte solution level monitoring device can be used for monitoring the condition of the electrolyte solution anytime in order to supplement the electrolyte solution.

The moving direction of the rotary filter belt 131 includes a horizontal moving direction and a vertical moving direction. When the graphene flakes fall onto the rotary filter belt 131, the graphene flakes are disposed at the top of the rotary filter belt 131 to perform a horizontal movement. Now, the graphene flakes are separated from the electrolyte solution. When the graphene flakes are disposed at the rotary filter belt 131 for a vertical movement, a portion of the graphene flakes fall into the grading collection unit 140 due to gravity, and the other portion of the graphene flakes remain on the rotary filter belt 131. When the rotary filter belt 131 is moved horizontally again, the graphene flakes are disposed under the rotary filter belt 131. In this preferred embodiment, deionized water can be sprayed by using a spray head, and the forces of water jet and gravity cause the graphene flakes to fall into the grading collection unit 140.

The grading collection unit is installed under the rotary filter belt and includes a plurality of mesh structured sieves 141, and each sieve 141 has a different mesh structure, such as a sieve 141 has meshes of a different size. The sieve 141 with larger meshes is installed at the top, and the sieve 141 with smaller meshes is installed at the bottom, so that the sieves 141 with different meshes can be used for separating graphene flakes of different sizes. In the meantime, a sieve vibrating device 142 is provided for vibrating the sieves 141 to improve the efficiency of separating the graphene flakes of different sizes.

While the invention has been described by means of specific embodiments, numerous modifications and variations could be made thereto by those skilled in the art without departing from the scope and spirit of the invention set forth in the claims.

What is claimed is:

1. A device designed for a continuous production of graphene flakes by an electrochemical method, comprising:
   an electrochemical unit, for exfoliating the graphene flakes by an electrochemical method;
   a filtration unit, for separating the graphene flakes from an electrolyte solution, and the filtration unit includes a rotary filter belt and an electrolyte solution recycling tank;
   a guiding path, coupled to the electrochemical unit, for transporting the graphene flakes and the electrolyte solution to the filtration unit; and
   a grading collection unit, for receiving the graphene flakes separated by the filtration unit and separating different sized graphene flakes;
   wherein the grading collection unit is installed under the rotary filter belt and includes a plurality of mesh structured sieves, and each sieve has a different mesh structure; moreover, a sieve vibrating device is set for vibrating the plurality of mesh structured sieves.

2. The device for a continuous production of graphene flakes by an electrochemical method according to claim 1, wherein the electrochemical unit includes a positive and negative electrode time-switching DC power, an auxiliary heating device, an electrolytic bath and a graphite electrode set.

3. The device for a continuous production of graphene flakes by an electrochemical method according to claim 2, wherein the graphite electrode set includes a graphite electrode for passing positive electricity and another graphite electrode for passing negative electricity.

4. The device for a continuous production of graphene flakes by an electrochemical method according to claim 3, wherein the graphite electrodes are made of a material selected from the collection of natural graphite, highly crystalline graphite, coke-based artificial graphite, mesophase pitch-based artificial graphite, polymer based artificial graphite, carbon fiber, graphite fiber, and a carbon/carbon composite.

5. The device for a continuous production of graphene flakes by an electrochemical method according to claim 3, wherein the graphite electrodes are arranged in a serial connection or a parallel connection.

6. The device for a continuous production of graphene flakes by an electrochemical method according to claim 2, further comprising an electrolyte solution tempering tank disposed on a side of the electrolytic bath, and the bottom of the electrolyte solution tempering tank is higher than the level of the electrolyte solution in the electrolytic bath.

7. The device for a continuous production of graphene flakes by an electrochemical method according to claim 1, wherein the auxiliary heating device includes a microwave, ultrasound or non-contact heating device.

8. The device for a continuous production of graphene flakes by an electrochemical method according to claim 2, further comprising an electrolyte solution monitoring device, and the electrolyte solution monitoring device includes a pH meter and an electrolyte solution level monitoring device.

9. The device for a continuous production of graphene flakes by an electrochemical method according to claim 1, wherein the guiding path has a tilted angle and includes an outlet end disposed on the filtration unit.

10. The device for a continuous production of graphene flakes by an electrochemical method according to claim 9, wherein the rotary filter belt has a width greater than the outlet end.

11. The device for a continuous production of graphene flakes by an electrochemical method according to claim 1, wherein the rotary filter belt includes a mesh structure.

12. The device for a continuous production of graphene flakes by an electrochemical method according to claim 1, further comprising a spray head for spraying deionized water to the rotary filter belt.

13. The device for a continuous production of graphene flakes by an electrochemical method according to claim 2, further comprising a deionized water storage tank installed on a side of the electrolytic bath.

* * * * *